United States Patent [19]

Williams

[11] Patent Number: 6,042,175
[45] Date of Patent: Mar. 28, 2000

[54] EQUIPMENT TRAILER

[75] Inventor: Marty Williams, Colorodo Springs, Colo.

[73] Assignee: Let's Go Aero, Inc., Colorado Springs, Colo.

[21] Appl. No.: 09/100,808

[22] Filed: Jun. 19, 1998

[51] Int. Cl.⁷ .................................................. B60J 7/00
[52] U.S. Cl. ...................... 296/181; 296/173; 296/168; 296/100.06; 296/100.07
[58] Field of Search .................................. 296/173, 168, 296/181, 100.06, 100.07

[56] References Cited

U.S. PATENT DOCUMENTS

| | | | |
|---|---|---|---|
| 1,035,245 | 8/1912 | Sanders | 296/100.06 |
| 3,069,199 | 12/1962 | Reardon et al. | 296/100.07 |
| 3,288,521 | 11/1966 | Patnode | 296/173 |
| 3,822,798 | 7/1974 | Neff | 296/168 |
| 3,858,744 | 1/1975 | Garvert | 296/100.07 |
| 3,977,720 | 8/1976 | Schreiberg | 296/181 |
| 4,420,182 | 12/1983 | Kaneshiro | 296/168 |
| 4,627,658 | 12/1986 | Vold et al. | 296/100.07 |
| 4,943,108 | 7/1990 | Turnbull | 296/100.07 |

FOREIGN PATENT DOCUMENTS

| | | | |
|---|---|---|---|
| 26681 | 6/1954 | Finland | 296/173 |
| 1146723 | 5/1957 | France | 296/173 |
| 689969 | 8/1949 | United Kingdom | 296/173 |
| 969374 | 4/1962 | United Kingdom | 296/173 |

Primary Examiner—Joseph D. Pape
Assistant Examiner—Kiran Patel
Attorney, Agent, or Firm—Glenn L. Webb

[57] ABSTRACT

A trailer for transporting equipment, such as bicycles. The trailer of a preferred embodiment of the present invention includes a partial enclosed body having a substantially oval shape. Two opposing hatch lid members are pivotally mounted on each end of the body. The two hatch lid members open upward and outward to allow full access to the interior of the trailer. The two hatch lid members then close downward and towards one another with a slight overlap to fully enclose the body to form the trailer body. The axle assembly and tongue are directly mounted on the lower surface of the trailer body. Equipment mounting devices are formed or affixed directly in the interior of the trailer body. The equipment is thus able to be securely transported without danger from the elements or from unauthorized access.

20 Claims, 3 Drawing Sheets

EQUIPMENT TRAILER

FIELD OF THE INVENTION

This invention relates to the field of wheeled trailers, and particularly, to trailers for the use with sports equipment and other equipment.

BACKGROUND OF THE INVENTION

The use of sports equipment, as well as other recreational equipment is often hindered by the necessity of transporting the equipment to various locations. One example of this problem is the need to transport bicycles to a desired location, such as a vacation site, tour site, trail site, race, or other locations. Typically this requires either carrying the bicycle in a trunk, bed or backseat of the vehicle or else the use of a carrier of some sort, such as a car top carrier, trunk mounted carrier or receiver mounted carrier.

The use of the interior of the vehicle to transport the equipment creates a number of problems. For instance the lack of available space can be particularly a problem when there are several individuals with their associated equipment involved, especially if there is any significant distance to be traveled. Also, the view of the driver can be easily obstructed by the equipment. There is also a problem associated with damage to the equipment since the vehicle interior is seldom designed to accommodate such equipment. The security of the equipment is also an issue when the vehicle is left unattended, particularly overnight, since it is normally noticeable through the windows of the vehicle.

The use of exterior carriers also have significant problems. Exterior carriers tend to be either the modular component carriers which use racks on the vehricle top, rear or on the receiver, or else the "box-type" carriers which are essentially cargo boxes mounted on the rooftop. These carriers are cumbersome and create significant aerodynamic problems. The security of such devices are also questionable when the vehicle is left unattended. Also, the equipment is normally uncovered and susceptible to damage from the elements. Another problem with these carriers is the lack of accessibility to the equipment.

Prior trailers did not satisfactorily address these problems. The prior trailers were not designed specifically for these particular uses. The trailers tended to be boxy and relatively heavy. These trailers normally were accessible either by a rear or side door or else were open on top. Some trailers did have a removable top which tended to be cumbersome and difficult to use. The prior trailers were relatively expensive as well.

None of the prior carriers satisfactorily provided the ease of transporting equipment, the security and the convenience of storage of equipment that is desired. It is therefore desirable to provide such a device that will allow equipment, such as sports equipment as well as other recreational and work equipment, to be easily and securely transported and stored between locations.

SUMMARY OF THE INVENTION

The present invention accomplishes those needs by providing a trailer for transporting equipment between locations. The trailer of the present invention proves a secure and efficient device for transporting such equipment in a secure manner. The trailer of the present invention is relatively inexpensive and is formed of lightweight, high-strength materials. The trailer of the present invention is able to be towed behind most vehicles with little loss in speed or maneuverability. The present invention is aerodynamically shaped, yet is able to securely hold a large amount of equipment, such as bicycles.

The present invention does this by providing a trailer having a body which is fully enclosable, yet having lid members which easily open to allow full access to the body. The enclosure body is formed of a high-strength, light weight plastic material. The lower enclosure body has a substantially oval shape with features pre-molded therein. For instance, the trailer hitch tongue, in one preferred embodiment, is bolted directly onto the lower enclosure body. The axle assembly is also bolted directly onto the enclosure body. This eliminates the need for a trailer frame and the associated weight and expense. In other embodiments, a lightweight trailer frame is used.

A first hatch lid member is pivotally mounted on the front end of the lower enclosure body with a mating second hatch lid member pivotally mounted on the rear end of the lower enclosure body. The two lid members pivot upward and away from one another to allow full access to the lower enclosure body. The two lid members then pivot downward and toward one another with a slight overlap when fully closed. This fully encloses the lower enclosure body as well as providing a substantial amount of additional storage as well.

The two hatch lid members include overlapping edges on their ends as well as their sides to seal the enclosure from the outside elements as well as from unauthorized access. The two hatch lid members can also be locked to prevent unauthorized access. The interior of the enclosure body includes hardware for securing the equipment in place. For instance, bike mounting devices can be installed or even formed inside the floor of the lower enclosure body. Also, cargo bins can be affixed or formed in the lower enclosure body as well in the interior of the two hatch lid members. Hooks and other devices can be installed or formed to attach other devices, such as cargo nets, and straps.

Other variations of the trailer can be used as well to transport other types of equipment, such as skis, luggage, kayaks as well as work equipment and tools. In other embodiments include one wheeled trailers, multiple axle trailers, or even trailers not supported by wheels but cantilevered off the rear of the vehicle. Other shapes and configurations of trailers include streamlined trailers having wind-spoilers, wind deflectors, or unique shapes which identify manufacturers, sports teams, sponsors for race teams, and other fanciful shapes.

These and other features of the present invention are evident from the drawings along with the detailed description of preferred embodiments.

DETAILED DESCRIPTION OF A PREFERRED EMBODIMENT

Referring in more detail to the drawings, as shown in FIGS. 1–6, a preferred embodiment of the present invention is described. It is to be expressly understood that this exemplary embodiment is provided for descriptive purposes only and is not meant to unduly limit the scope of the present inventive concept. Other embodiments, and variations of the trailer of the present invention are considered within the present inventive concept as set forth of the claims herein. For explanatory purposes only, the trailer of the preferred embodiment is discussed primarily for use with bicycles. It is to be expressly understood that other types of equipment are contemplated for use with the present invention as well.

Figure 1:
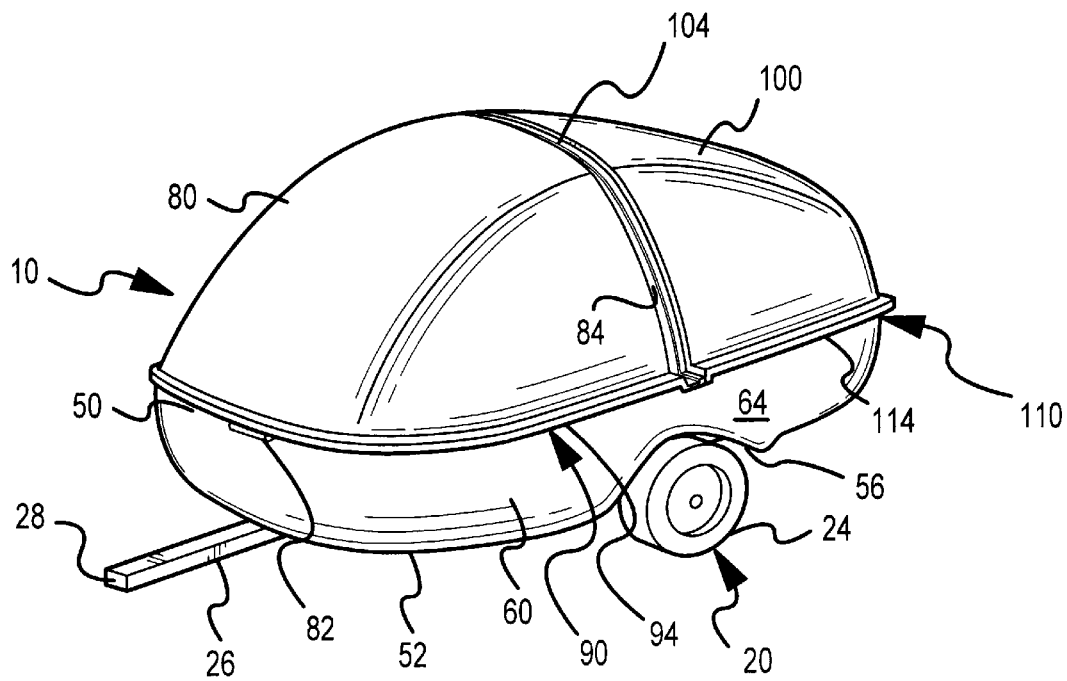
FIG. 1 is a perspective view of a preferred embodiment of a trailer of the present invention.
Figure 2:
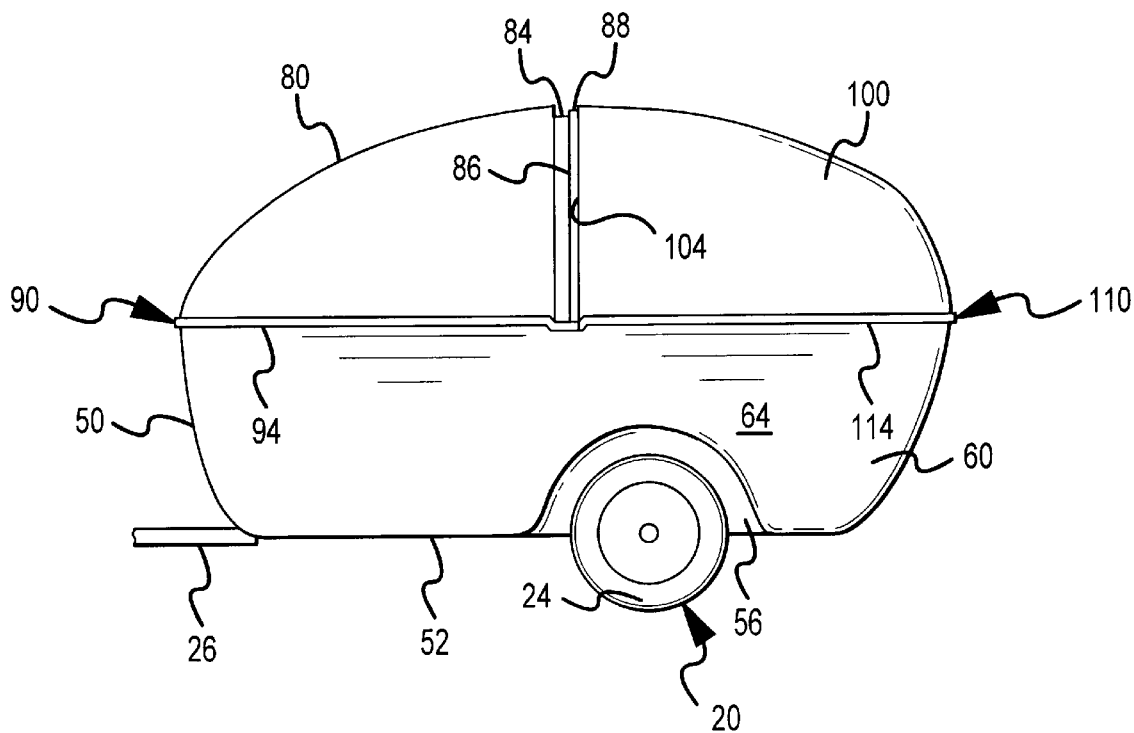
FIG. 2 is a side view of the trailer of the embodiment of FIG. 1.
Figure 3:
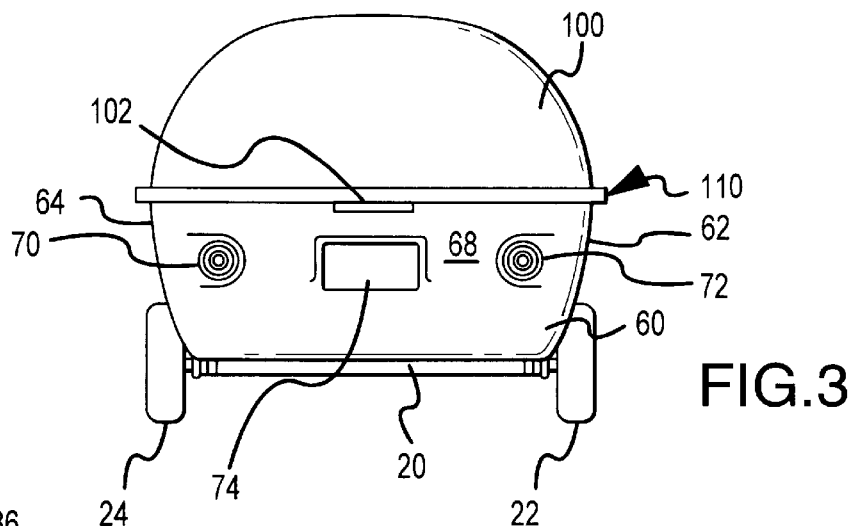
FIG. 3 is a rear view of the trailer of the embodiment of FIG. 1.

Trailer 10, as shown in FIG. 1, is a preferred embodiment of the present invention. Trailer 10 includes an enclosure 50 and an axle assembly 20 having wheels 22, 24 as shown in FIGS. 2 and 3. The axle assembly 20 is bolted directly onto the bottom of enclosure 50, as discussed in further detail below. A tongue 26 extends outwardly from the front of the enclosure 50, as shown in FIG. 1. The tongue 26, in the preferred embodiment, is bolted directly onto the bottom of the enclosure 50 as discussed in greater detail below. A conventional hitch (not shown) is affixed to the front end 28 of the tongue to allow the trailer 10 to be pulled behind a vehicle. In other embodiments, the axle assembly, tongue and trailer hitch assembly are formed as a trailer frame upon which the enclosure is mounted.

The enclosure 50 is formed from a high-strength, durable plastic material to create a lightweight durable trailer. In the preferred embodiment, the enclosure 50 is substantially oval or rounded in shape to increase the aerodynamic qualities and to decrease manufacturing expense. It is to be expressly understood that other shapes and configurations can be utilized under the present invention as well. The enclosure 50 includes a lower enclosure body 60. The bottom 52 of the enclosure 50 includes slots and recesses for the tongue 26 and the axle assembly 20 to be bolted directly onto the enclosure 50. Wheel wells 54, 56 are recessed into the side portions 62, 64 of the lower enclosure body 60. Taillight recesses 70, 72, as shown in FIG. 3, are also directly formed in the rear surface 68 of the lower enclosure body 60. Taillights, not shown, are then mounted within these recesses. A license plate recess 74 is also formed in the center of the rear surface 68 of the lower enclosure body 60.

A first hatch lid member 80 is pivotally attached to the lower enclosure body 60 by a living hinge 82, or by a separate hinge, extending along the front of the lower enclosure body 60. A second hatch lid member 100 also is pivotally attached to the lower enclosure body 60 by a living hinge 102 or by a separate hinge, extending along the rear of the lower enclosure body. The first hatch lid member 80 and the second hatch lid member 100, when in their lowered closed position as shown in FIGS. 1–3, form a "shell" over the lower enclosure body 60 to fully enclose the enclosure 50.

The first hatch lid member 80 includes a recessed end portion 84 extending about the perimeter of the rear portion 86 of the first hatch lid member 80. The recessed end portion 84 terminates in an upturned lip 88. The second hatch lid member 100 includes a recessed end portion 104 extending about it's rear portion 106. The recessed end portion 106 terminates in a flat lip 108. In the closed position, the recessed end portion 84 of the first hatch lid member overlaps the recessed end portion 104 of the second hatch lid member. This forms an effective seal as well as adding reinforcement to the enclosure 50.

The first hatch lid member 80 also includes an outwardly extending lip portion 90 extending around the perimeter of the bottom portion 92. This lip portion 90 terminates in a downwardly extending lip 94. The second hatch lid member 100 has a similar outwardly extending lip portion 110 which terminates in a downwardly extending lip 114. These lip portions 90 and 110 form a seal over the joint between the lower enclosure body 60 and the first hatch lid member 80 and the second hatch lid member 100 when the lid members are in the closed position. This prevents rain, snow, and other debris from entering into the enclosure as well as preventing unauthorized access into the enclosure.

One or more slots (not shown) are formed in the first hatch lid member 80 in the recessed end portion 84 and/or in the outwardly extending lip portion 90. These slot(s) engage over a clasp or other locking device affixed to the recessed end portion 104 and/or in the outwardly extending lip portion 110 of the second hatch lid member to enable the lid members to be locked together and/or onto the lower enclosure body 60 to prevent unauthorized access.

Figure 4:
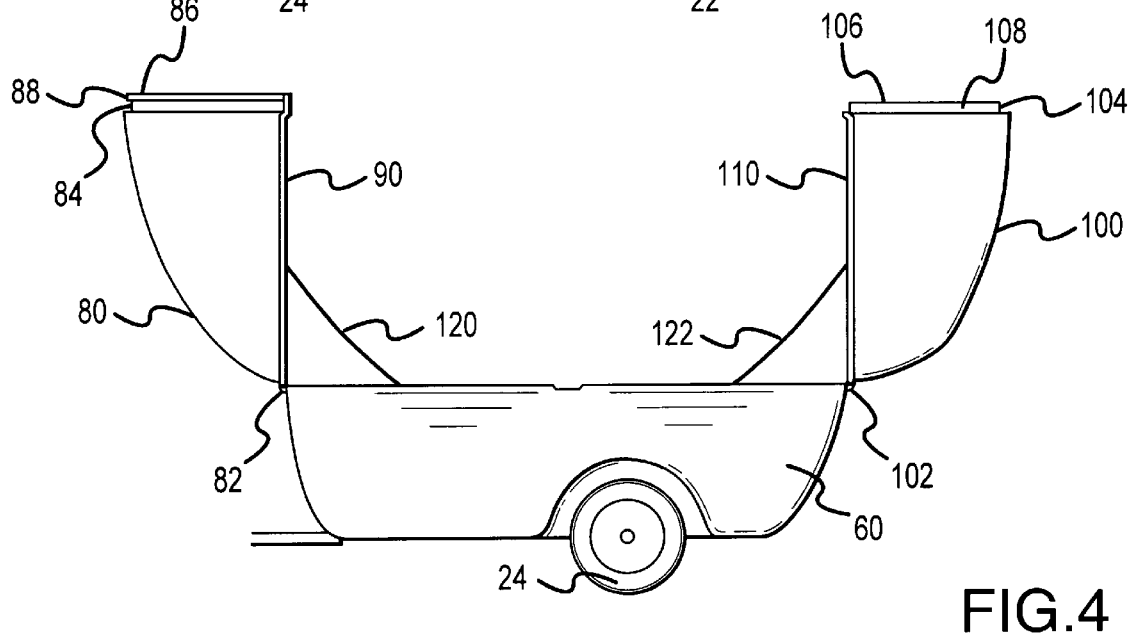
FIG. 4 is a side view of the trailer of the embodiment of FIG. 1 with the hatch lid members in an open position.

The first hatch lid member 80 and the second hatch lid member 100 are pivotable upward, as shown in FIG. 4, about their respective hinges to allow access into the enclosure 50. This opening within the center of the enclosure 50 allows quick and ready access to all parts of the interior of the enclosure 50 so that unloading of all the equipment contained therein is not necessary to gain access to equipment stored away from an opening as was the case in prior trailers.

Retaining cables 120, 122, or other retaining devices are used to prevent the lid members from pivoting beyond the opened position which might damage the trailer and also to enable the lid members to be easily closed without undue lifting. Also, finger holes or handles can be formed or attached to the lid members to assist in opening and closing the lid members.

Figure 5:
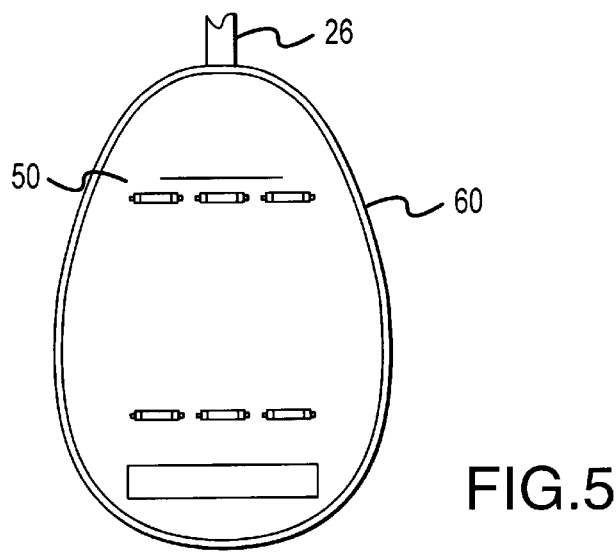
FIG. 5 is a top view of the trailer of FIG. 4 viewing the interior of the trailer.

Securing devices, such as bicycle skewer mounts, trays, clasps and other such devices can be hard mounted within the interior of the enclosure 50, as shown in FIG. 5, to secure bicycles, or other equipment within the trailer. Also, equipment boxes, tool boxes, cargo bins, can be easily mounted or secured within the enclosure as well. In one preferred embodiment of the present invention, cargo net hooks are attached to allow equipment to be safely secured within the trailer.

In use, bicycles or other equipment is stowed and secured in the lower enclosure body 60 with the first hatch lid member 80 and second hatch lid member 100 in their up and open position. Once the equipment has been secured. The second hatch lid member is lowered to its closed position and then the first hatch lid member is lowered so that the recessed end portion 84 overlaps the recessed end portion 104 of the second hatch lid member. The lid members can be then be locked to prevent unauthorized access. The lid members can then be unlocked and raised to allow access to the equipment as necessary.

When the trailer is not in use for transporting equipment, it can be easily broken down. The tongue can be unbolted, or else the hitch assembly can be released by a quick-release mechanism. The axle assembly can be unbolted, but typically would be left in place. The lightweight of the enclosure and of the entire trailer allows it to be suspended out of the way for storage if desired.

The aerodynamic shape, and high-strength, lightweight structure of the trailer enables it to be easily towed behind most vehicles. However, other shapes are certainly within the scope of the present invention. For example, a lowered, wind-foil or raised wind-spoiler front lid member could be used. Also, the shape of the enclosure can be configured about the shape of the equipment to be transported, such as kayaks, skis, recumbent bicycles, and almost any other type of equipment. Additionally, the equipment need not be limited to sports or recreational equipment. The shape of the enclosure can be configured for utilitarian purposes, such as work-sites, or about work equipment or boxes.

The sides of the enclosure are particularly adaptable for the placement of decals and logos. Also, the shape of the enclosure can be formed to identify product manufacturers, team sponsors, or other fanciful shapes, beyond the utilitarian shape for the equipment.

Figure 6:
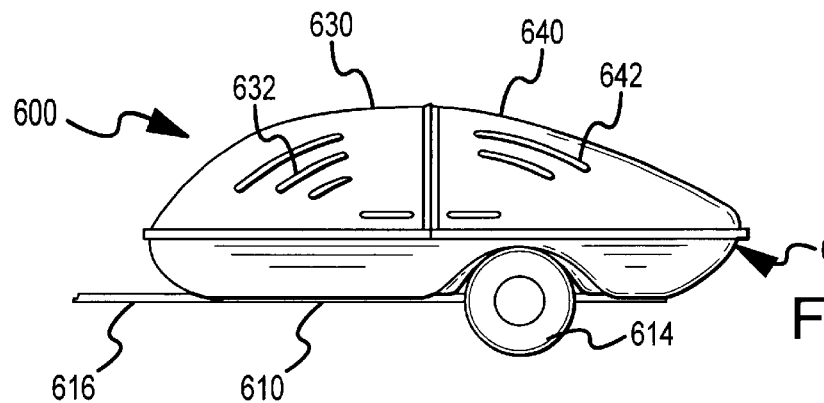
FIG. 6 is a side view of an alternative embodiment of a trailer of the present invention.
Figure 7:
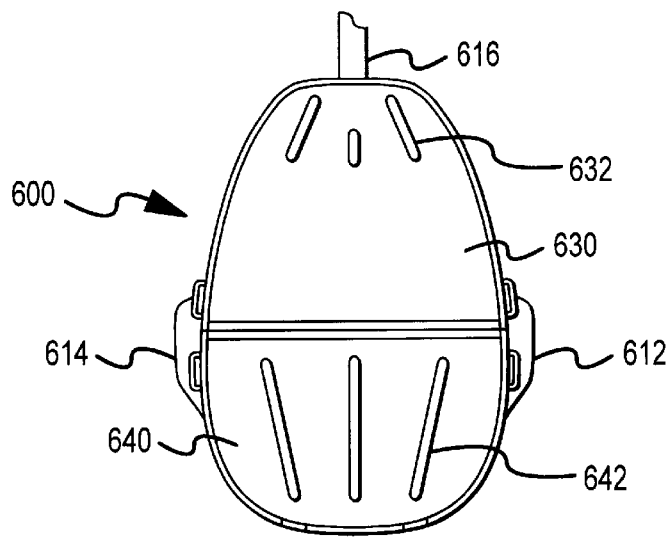
FIG. 7 is a top view of the trailer of FIG. 6.
Figure 8:
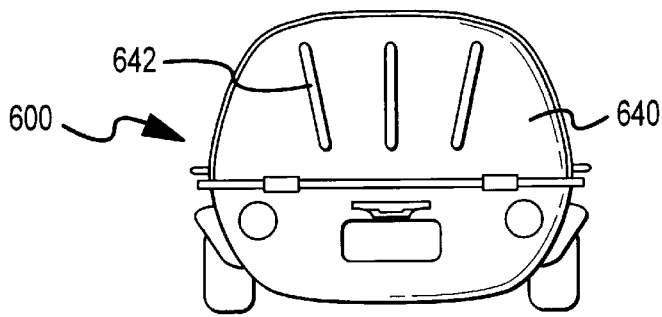
FIG. 8 is a rear view of the trailer of FIG. 6.

An alternative embodiment of the trailer of the present invention is shown in FIGS. 6–8. The trailer 600 includes a frame 610 having wheels 612, 614 mounted on an axle assembly secured to the frame. A tongue 616 extends outward from the frame 610. An enclosure body 620 is mounted onto the frame 610 by well-known fasteners. The enclosure body 620 extends forward on the frame 610 beyond the mid-center of the enclosure body 620. This provides more weight on the tongue and vehicle to allow greater stability under heavier loads. The front hatch lid member 630 and the rear hatch lid member 640 are asymmetrical. The rear hatch lid member 640 is longer with a lower profile than the front hatch lid member 630. This provides a more streamlined appearance as well as adding additional capacity. Reinforcement ribs 632, 642 also add strength to the hatch lid members. This embodiment has an increased payload compared to the above embodiment.

Further, the trailer of the present invention includes embodiments having only wheel, or with multiple axles to allow four or more wheels, depending on the use of the trailer. Also, in one embodiment, the trailer is directly mounted to the bumper or receive hitch of the vehicle. In another embodiment, the trailer is fully supported by the bumper or receiver hitch of the vehicle and does not use wheels. In yet another embodiment, one or more access hatches can be formed in the front, rear, sides or in the lid members of the enclosure to allow easy access to equipment or tools stored within the enclosure.

The present inventive concept, as set forth in the accompanying claims, covers not only the described embodiments but other embodiments, variations and configurations of the trailer as stated in the accompanying claims.

I claim:

1. A trailer for transporting equipment, said trailer comprising:
    an enclosure having a partially enclosed body;
    a first end portion on said partially enclosed body;
    means adjacent said first end portion for attaching said trailer to a vehicle;
    a second end portion on said partially enclosed body opposite of said first end portion and substantially parallel to said first end portion;
    a central portion of said enclosed body between said first end portion and said second end portion for storing equipment;
    a first hatch lid member pivotally mounted on said first end portion of said partially enclosed body to move from a closed position to an open position to allow access to said central portion of said enclosed body; and
    a second hatch lid member pivotally mounted on said second end portion of said partially enclosed body to move from a closed position to an open position wherein said first hatch lid member and said second hatch lid member fully enclose said enclosure in their respective closed position and allow access to said central portion of said enclosure in their respective open positions.

2. The trailer of claim 1 wherein said enclosure includes:
    means for releasably securing equipment in the interior of said enclosure.

3. The trailer of claim 1 wherein said enclosure includes:
    means for releasably securing at least one bicycle in the interior of said enclosure.

4. The trailer of claim 1 wherein said enclosure includes:
    means for securely storing cargo in one of said first hatch lid member and said second hatch lid member.

5. The trailer of claim 1 wherein said enclosure includes:
    means for securely storing cargo in said first hatch lid member and in said second hatch lid member.

6. The trailer of claim 1 wherein said enclosure includes:
    means for sealing said first hatch lid member and said second hatch lid member from outside elements when in their respective closed positions.

7. The trailer of claim 1 wherein said enclosure includes:
    means for securely locking said first hatch lid member and said second hatch lid member in their respective closed positions to prevent unauthorized access.

8. The trailer of claim 1 wherein said trailer includes:
    an axle assembly affixed onto said enclosure; and
    at least one wheel attached onto said axle assembly to support said trailer for movement.

9. The trailer of claim 1 wherein said means for attaching said trailer to a vehicle includes:
    a tongue affixed to said enclosure to allow said trailer to be pulled behind a vehicle; and
    means for quickly releasing said tongue from said enclosure to allow ease of storage of said trailer.

10. The trailer of claim 1 wherein said trailer includes:
    means for sealing said enclosure, said first hatch lid member and said second hatch lid member from outside elements.

11. A trailer for transporting equipment, said trailer comprising:
    an enclosure having a partially enclosed body;
    an axle assembly for supporting said enclosure for movement;
    a first end portion on said partially enclosed body substantially parallel to said axle assembly;
    means adjacent said first end portion for attaching said trailer to a vehicle;
    a second end portion on said partially enclosed body opposite of said first end portion and substantially parallel to said first end portion and to said axle assembly;
    a central portion of said enclosed body between said first end portion and said second end portion for storing equipment;
    a first hatch lid member pivotally mounted on said first end portion of said partially enclosed body to move from a closed position to an open position to allow access to said central portion of said enclosed body; and a second hatch lid member pivotally mounted on said second end portion of said partially enclosed body to move from a closed position to an open position wherein said first hatch lid member and said second hatch lid member fully enclose said enclosure in their respective closed position and allow access to said central portion of said enclosure in their respective open positions.

12. The trailer of claim 11 wherein said enclosure includes:

means for releasably securing equipment in the interior of said enclosure.

13. The trailer of claim 11 wherein said enclosure includes:

means for releasably securing at least one bicycle in the interior of said enclosure.

14. The trailer of claim 11 wherein said enclosure includes:

means for securely storing cargo in one of said first hatch lid member and said second hatch lid member.

15. The trailer of claim 11 wherein said enclosure includes:

means for securely storing cargo in said first hatch lid member and in said second hatch lid member.

16. The trailer of claim 11 wherein said enclosure includes:

means for sealing said first hatch lid member and said second hatch lid member from outside elements when in their respective closed positions.

17. The trailer of claim 11 wherein said enclosure includes:

means for securely locking said first hatch lid member and said second hatch lid member in their respective closed positions to prevent unauthorized access.

18. The trailer of claim 11 wherein said axle assembly includes:

at least one wheel attached onto said axle assembly to support said trailer for movement.

19. The trailer of claim 11 wherein said means for attaching said trailer to a vehicle includes:

a tongue affixed to said enclosure to allow said trailer to be pulled behind a vehicle; and means for quickly releasing said tongue from said enclosure to allow ease of storage of said trailer.

20. The trailer of claim 11 wherein said trailer includes:

means for sealing said enclosure, said first hatch lid member and said second hatch lid member from outside elements.

* * * * *